United States Patent [19]

Nakagawa et al.

[11] Patent Number: 5,556,809
[45] Date of Patent: Sep. 17, 1996

[54] DIRECT-CONTACT TYPE IMAGE SENSOR DEVICE, AN IMAGE SENSOR UNIT, AND METHODS FOR PRODUCING THE SAME

[75] Inventors: Masahiro Nakagawa, Osaka; Tetsuro Nakamura, Takarazuka; Shinji Fujiwara, Kobe; Eiichiro Tanaka, Kishiwada, all of Japan

[73] Assignee: Matsushita Electric Industrial Co., Ltd., Osaka, Japan

[21] Appl. No.: 351,020

[22] Filed: Dec. 7, 1994

Related U.S. Application Data

[62] Division of Ser. No. 141,328, Oct. 21, 1993, Pat. No. 5,477,047.

[30] Foreign Application Priority Data

| Oct. 23, 1992 | [JP] | Japan | 4-285759 |
| Dec. 8, 1992 | [JP] | Japan | 4-327753 |
| Jun. 10, 1993 | [JP] | Japan | 5-138225 |

[51] Int. Cl.⁶ .................................................. H01L 21/60
[52] U.S. Cl. ........................... 437/209; 437/211; 437/214; 437/215; 437/217
[58] Field of Search ........................... 437/209, 210, 437/211, 212, 213, 214, 215, 216, 217, 218, 219, 220, 221, 222, 223, 224

[56] References Cited

U.S. PATENT DOCUMENTS

| 4,446,364 | 5/1984 | Hayashi et al. . | |
| 4,733,096 | 3/1988 | Horiguchi . | |
| 4,749,120 | 6/1985 | Hatada | 228/123 |
| 4,763,010 | 8/1988 | Fukaya et al. . | |
| 4,792,670 | 12/1988 | Fukaya et al. . | |
| 4,997,791 | 3/1991 | Ohuchi et al. | 437/215 |
| 5,037,780 | 8/1991 | Fujimoto et al. | 437/212 |
| 5,065,006 | 11/1991 | Nakamura et al. | 250/208.1 |
| 5,071,787 | 12/1991 | Mori et al. | 437/209 |
| 5,138,145 | 8/1992 | Nakamura et al. | 437/212 |
| 5,162,644 | 11/1992 | Nagata et al. | 250/208.1 |
| 5,264,393 | 11/1993 | Tamura et al. | 437/209 |
| 5,405,809 | 4/1995 | Nakamura et al. | 437/211 |

FOREIGN PATENT DOCUMENTS

| 0154962 | 9/1985 | European Pat. Off. . |
| 0177117 | 4/1986 | European Pat. Off. . |
| 0296603 | 12/1988 | European Pat. Off. . |
| 0298458 | 1/1989 | European Pat. Off. . |
| 0361515 | 4/1990 | European Pat. Off. . |
| 0461302 | 12/1991 | European Pat. Off. . |
| 2568060 | 1/1986 | France . |
| 3111746 | 1/1982 | Germany . |
| 3643576 | 7/1987 | Germany . |
| 2228366 | 8/1990 | United Kingdom . |

OTHER PUBLICATIONS

EPO, European Search Report for counterpart application EP 93117154.0, mailed Jan. 4, 1994.

"Direct-Contact Type Image Sensors Using a Novel Amorphous-Silicon Photodiode Array"; by Hiroaki Kakinuma, et al.; IEEE Electron Device Letters; vol. 12, No. 8(1991) Aug.; pp. 413–415.

*Primary Examiner*—Kevin M. Picardat
*Attorney, Agent, or Firm*—Ratner & Prestia

[57] ABSTRACT

A direct-contact type image sensor device according to the present invention includes: a light-transmitting substrate having an upper surface and a lower surface; a patterned conductor layer formed over the upper surface of the light-transmitting substrate; e transparent electrically conductive layer formed on the lower surface of the light-transmitting substrate; an image sensor chip mounted face-down on the upper surface of the light-transmitting substrate, with an insulating resin layer being interposed between the image sensor chip and the upper surface of the light-transmitting substrate, the image sensor chip being mounted by a flip-chip-bonding method, a light-interrupting layer provided between the patterned conductor layer and the upper surface of the light-transmitting substrate; and a light-interrupting portion for interrupting a portion of a light beam, the light beam being radiated on an original through the light-transmitting substrate by a light source disposed above the light-transmitting substrate. The image sensor chip and the light-interrupting portion serve as an optical throttle for the light beam.

7 Claims, 5 Drawing Sheets

DIRECT-CONTACT TYPE IMAGE SENSOR DEVICE, AN IMAGE SENSOR UNIT, AND METHODS FOR PRODUCING THE SAME

This application is a division of application Ser. No. 08/141,328, filed Oct. 21, 1993, now U.S. Pat. No. 5,477,047.

BACKGROUND OF THE INVENTION

1. Field of the Invention

The present invention relates to an image sensor device which comes in contact with an image to be read and converts optical image information into electric signals, and an image sensor unit in which the image sensor device is used, as well as methods for producing the same. More specifically, the present invention relates to a direct-contact type image sensor device that can be suitably used in a facsimile, an image reader, etc., which image sensor device comes in complete contact with an original to be read so as to read image information in a vertical direction with respect to a direction in which the original is conveyed, and an image sensor unit in which the image sensor device is used, as well as methods for producing the same.

2. Description of the Related Art

As image sensors which convert one-dimensional image information into electric signals, there have been realized reduction-type image sensors including a one-dimensional CCD (Charge Coupled Device), one-dimensional image sensors including a long-size sensor which conducts neither magnification nor reduction, and the like. Such conventional image sensors have been put on the market. A one-dimensional image sensor including a long-size sensor has such excellent features as high utilization efficiency of light, high-speed reading, and the small size of the whole optical system. Such an image sensor is categorized into a contact type image sensor, which includes an array of convergence-type lot lenses, and a direct-contact type image sensor, which includes no optical lenses. The direct-contact type image sensor can be fabricated at low cost, since no array of convergence-type lot lenses is required therein. Moreover, the direct-contact type image sensor can easily be realized in e small size.

Figure 8:
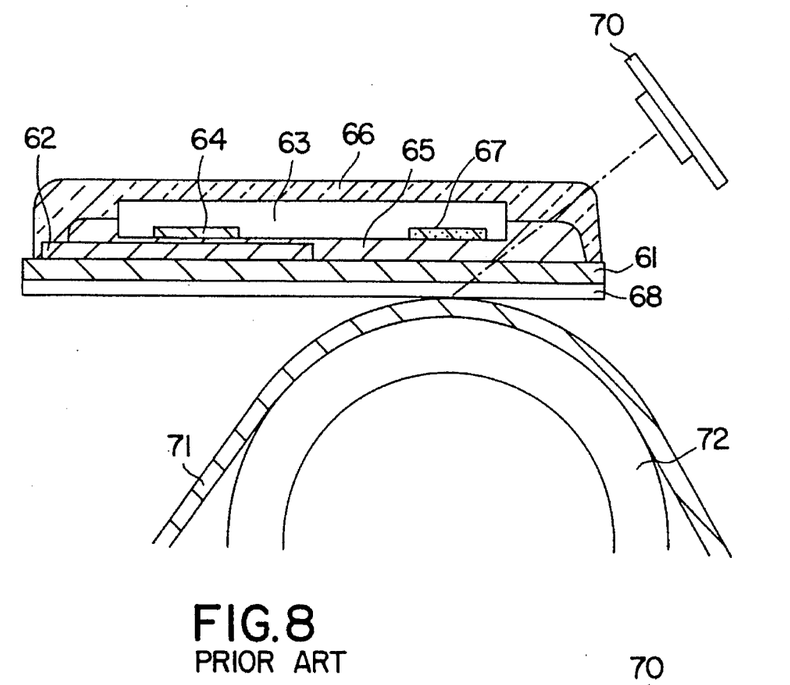
FIG. 8 is a view showing a front cross section of a conventional image sensor unit.

FIG. 8 shows a conventional direct-contact type image sensor device. As is shown in FIG. 8, the image sensor device includes a light-transmitting substrate 61 on which a circuit conductor layer 62 is formed. An image sensor chip 63 is mounted face-down on, by way of e transparent insulating resin layer 65, the upper surface of the light-transmitting substrate 61. A flip-chip-bonding method is used in mounting the image sensor chip 63. On the lower surface of the light-transmitting substrate 61, a transparent electrically conductive layer 68 is formed. A transparent protection layer 66 is formed over the light-transmitting substrate 61 so as to cover the image sensor chip 63. The image sensor chip 63 includes a light-sensitive element array 67 and electrodes 64, which are in contact with the circuit conductor layer 62. A light source 70 radiates a light beam on an original 71 through the transparent insulating resin layer 65, the light-transmitting substrate 61, and the transparent conductive layer 68, respectively. (In the present specification, the term "original" refers to any material on which optical information is carried. The optical information may be written, printed, painted, copied, etc. on the original.) The light beam is reflected from the original 71 so as to be received by the light-sensitive element array 67 by way of the transparent conductive layer 68, the light-transmitting substrate 61, and the transparent insulating resin layer 65.

Each of the transparent insulating resin layer 65, the light-transmitting substrate 61, and the transparent conductive layer 68 must have a certain thickness in order that the image sensor device has sufficient physical strength. However, there is a problem that optical crosstalk occurs within the light-transmitting substrate 61 as well as other places when the thicknesses of the transparent insulating resin layer 65, the light-transmitting substrate 61, and the transparent conductive layer 68 are increased, since the distance between the light-sensitive element array 67 and the original 71 is increased. Such optical crosstalk decreases the MTF (Modulation Transfer Function) value and/or the resolution of the image sensor device.

Figure 9:
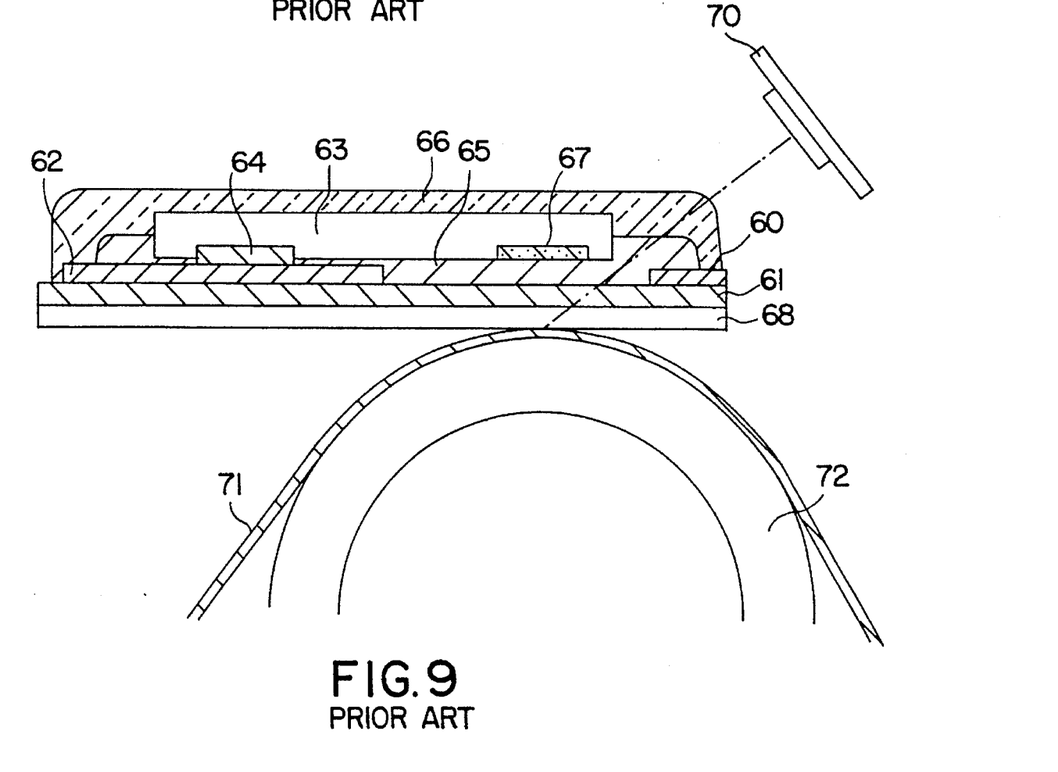
FIG. 9 is a view showing a front cross section of a conventional image sensor unit.

FIG. 9 shows a conventional direct-contact type image sensor device obtained by further providing a light-interrupting layer 60 for the image sensor device shown in FIG. 8. The light-interrupting layer 60 is formed on the upper surface of a light-transmitting substrate 61. The light-interrupting layer 60 partially interrupts a light beam which is emitted from a light source 70 disposed obliquely above the light-transmitting substrate 61 and is radiated on an original 71 through a transparent protection layer 66, a transparent insulating resin layer 65, and the light-transmitting substrate 61. By providing the light-interrupting layer 60, an unnecessary portion of light entering from above is interrupted. As a result, flares and crosstalk can be reduced.

SUMMARY OF THE INVENTION

A direct-contact type image sensor device according to the present invention comprises: a light-transmitting substrate having an upper surface and a lower surface; a patterned conductor layer formed over the upper surface of the light-transmitting substrate; a transparent electrically conductive layer formed on the lower surface of the light-transmitting substrate; and an image sensor chip mounted face-down on the upper surface of the light-transmitting substrate, with an insulating resin layer being interposed between the image sensor chip and the upper surface of the light-transmitting substrate, the image sensor chip being mounted by a flip-chip-bonding method, the image sensor device further comprising: a light-interrupting layer provided between the patterned conductor layer and the upper surface of the light-transmitting substrate; and a light-interrupting portion for interrupting a portion of a light beam, the light beam being radiated on an original through the light-transmitting substrate by a light source disposed above the light-transmitting substrate, the image sensor chip and the light-interrupting portion serving as an optical throttle for the light beam.

In one embodiment of the invention, a region where the light-interrupting portion is formed is shifted from, along the upper surface of the light-transmitting substrate, a region directly under the image sensor chip, thereby forming a first slit for transmitting a portion of the light beam.

In another embodiment of the invention, the image sensor device further comprises a second conductor layer between the lower surface of the light-transmitting substrate and the transparent electrically conductive layer, the second conductor layer having a second light-interrupting portion for interrupting a portion of the light beam.

In still another embodiment of the invention, a region where the second light-interrupting portion of the second conductor layer is formed is shifted from, along the lower surface of the light-transmitting substrate, a region directly under the image sensor chip, thereby forming a second slit for transmitting a portion of the light beam.

In still another embodiment of the invention, the second light-interrupting portion of the second conductor layer is electrically connected to a potential source having a predetermined potential.

In still another embodiment of the invention, the predetermined potential is that of the ground level.

In still another embodiment of the invention, the second conductor layer includes a second circuit portion, the second circuit portion and the circuit portion of the conductor layer being electrically interconnected by a through hole.

In still another embodiment of the invention, the image sensor device further comprises a transparent protection layer formed on the upper surface of the light-transmitting substrate, the transparent protection layer covering the image sensor chip.

Alternatively, a direct-contact type image sensor device according to the present invention comprises: a light-transmitting substrate having an upper surface and a lower surface; a patterned conductor layer formed on the upper surface of the light-transmitting substrate; a transparent electrically conductive layer formed on the lower surface of the light-transmitting substrate; and an image sensor chip mounted face-down on the upper surface of the light-transmitting substrate, with an insulating resin layer being interposed between the image sensor chip and the upper surface of the light-transmitting substrate, the image sensor chip being mounted by a flip-chip-bonding method, wherein the patterned conductor layer includes a circuit portion electrically connected to the image sensor chip and a light-interrupting portion for interrupting a portion of a light beam, the light beam being radiated on an original through the light-transmitting substrate by a light source disposed above the light-transmitting substrate, the image sensor chip and the light-interrupting portion serving as an optical throttle for the light beam.

In one embodiment of the invention, a region where the light-interrupting portion of the conductor layer is formed is shifted from, along the upper surface of the light-transmitting substrate, a region directly under the image sensor chip, thereby forming a first slit for transmitting a portion of the light beam.

In another embodiment of the invention, the image sensor device further comprises a patterned second conductor layer between the lower surface of light-transmitting substrate and the transparent electrically conductive layer, the second conductor layer having a second light-interrupting portion for interrupting a portion of the light beam.

In still another embodiment of the invention, a region where the second light-interrupting portion of the second conductor layer is formed is shifted from, along the lower surface of the light-transmitting substrate, a region directly under the image sensor chip, thereby forming a second slit for transmitting a portion of the light beam.

In still another embodiment of the invention, the second light-interrupting portion of the second conductor layer is electrically connected to a potential source having a predetermined potential.

In still another embodiment of the invention, the predetermined potential is that of the ground level.

In still another embodiment of the invention, the second conductor layer includes a second circuit portion, the second circuit portion and the circuit portion of the conductor layer being electrically interconnected by a through hole.

In still another embodiment of the invention, the image sensor device further comprises a transparent protection layer formed on the upper surface of the light-transmitting substrate, the transparent protection layer covering the image sensor chip.

In still another embodiment of the invention, a reinforcement plate-is provided on the upper surface of the light-transmitting substrate.

In still another embodiment of the invention, the reinforcement plate has an opening, the image sensor chip and the first slit being provided in the opening.

In still another embodiment of the invention, a transparent protection layer for covering the image sensor chip is provided in the opening of the reinforcement plate.

In still another embodiment of the invention, the reinforcement plate is a printed wiring board made of glass epoxy having a thickness of 50 µm or more having electrodes for a driving circuit.

In still another embodiment of the invention, the reinforcement plate is a substrate made of glass or plastic having a thickness of 50 µm or more, the substrate having a color capable of interrupting light.

In still another embodiment of the invention, the electrodes of the printed wiring board and the conductor layer formed on the upper surface of the light-transmitting substrate are electrically interconnected with solder.

An image sensor unit according to the present invention comprises: a direct-contact type image sensor device including a light-transmitting substrate having an upper surface and a lower surface, a patterned conductor layer formed on the upper surface of the light-transmitting substrate, a transparent electrically conductive layer formed on the lower surface of the light-transmitting substrate, and an image sensor chip mounted face-down on the upper surface of the light-transmitting substrate, with an insulating resin layer being interposed between the image sensor chip and upper surface of the light-transmitting substrate, the image sensor chip being mounted by a flip-chip-bonding method: and a light source for irradiating an original through and from above the light-transmitting substrate, wherein the patterned conductor layer includes a circuit portion electrically connected to the image sensor chip and a light-interrupting portion for interrupting a portion of a light beam radiated by the light source, the image sensor chip and the light-interrupting portion serving as an optical throttle for the light beam.

In one embodiment of the invention, a region where the light-interrupting portion of the conductor layer is formed is shifted from, along the upper surface of the light-transmitting substrate, a region directly under the image sensor chip, thereby forming a first slit for transmitting a portion of the light beam, and the light source is so disposed that the light beam emitted thereby is incident to the first slit at an incident angle in the range of 0° to 30°.

In another embodiment of the invention, the image sensor unit further comprises a patterned second conductor layer between the lower surface of the light-transmitting substrate and the transparent electrically conductive layer, the second conductor layer having a second light-interrupting portion for interrupting a portion of the light beam.

In still another embodiment of the invention, a region where the second light-interrupting portion of the second conductor layer is formed is shifted from, along the lower surface of the light-transmitting substrate, a region directly under the image sensor chip, thereby forming a second slit for transmitting a portion of the light beam.

In still another embodiment of the invention, the second light-interrupting portion of the second conductor layer is electrically compacted to the ground level.

In still another embodiment of the invention, the second conductor layer includes a second circuit portion, the second circuit portion and the circuit portion of the conductor layer being electrically interconnected by a through hole.

In still another embodiment of the invention, the image sensor unit further comprises a transparent protection layer for covering the image sensor chip formed on the upper surface of the light-transmitting substrate.

In still another embodiment of the invention, a reinforcement plate is provided on the upper surface of the light-transmitting substrate.

In still another embodiment of the invention, the reinforcement plate has an opening, the image sensor chip and the first slit being provided in the opening.

In still another embodiment of the invention, a transparent protection layer for covering the image sensor chip is provided in the opening of the reinforcement plate.

A method for producing a direct-contact type image sensor device according to the present invention comprises: a light-transmitting substrate having an upper surface and a lower surface; a conductor layer formed on the upper surface of the light-transmitting substrate; a transparent electrically conductive layer formed on the lower surface of the light-transmitting substrate; and an image sensor chip mounted face-down on the upper surface of the light-transmitting substrate, with an insulating resin layer being interposed between the image sensor chip and the upper surface of the light-transmitting substrate, the image sensor chip being mounted by a flip-chip-bonding method, and conductor layer including a circuit portion electrically connected to The image sensor chip and a light-interrupting portion for interrupting a portion of a light beam, the light beam being radiated on an original through the light-transmitting substrate by a light source disposed above the light-transmitting substrate, he method including: a step for depositing the conductor layer on the upper surface of the light-transmitting substrate; and a step for patterning the conductor layer by a photolithography method so as to form the circuit portion and the light-interrupting portion by use of the same mask.

A method for producing a direct-contact type image sensor device according to the present invention comprises: a light-transmitting substrate having an upper surface and a lower surface; a first conductor layer formed on the upper surface of the light-transmitting substrate; a second conductor layer formed on the lower surface of the light-transmitting substrate; a transparent electrically conductive layer formed on the second conductor layer: and an image sensor chip mounted face-down on the upper surface of the light-transmitting substrate, with an insulating resin layer being interposed between the image sensor chip and the upper surface of the light-transmitting substrate, the image sensor chip being mounted by a flip-chip-bonding method, the first conductor layer including a circuit portion electrically connected to the image sensor chip and a light-interrupting portion for interrupting a portion of a light beam, the light beam being radiated on an original through the light-transmitting substrate by a light source disposed above the light-transmitting substrate, and the second conductor layer including a second circuit portion and a second light-interrupting portion for interrupting a portion of the light beam, the method including: a step for depositing the first conductor layer on the upper surface of the light-transmitting substrate; a step for patterning the first conductor layer by a photolithography method so form the first circuit portion and the first light-interrupting portion by use of the same mask; a step for depositing the second conductor layer on the lower surface of the light-transmitting substrate; and a step for patterning the second conductor layer by a photolithography method so as to form the second circuit portion and the second light-interrupting portion by use of the same mask.

In one embodiment of the invention, the method further includes a step for forming a through hole for electrically interconnecting the first circuit portion and the second circuit portion.

In another embodiment of the invention, the method further includes: a step for applying an adhesive on a predetermined portion of the light-transmitting substrate; a step for placing a reinforcement plate having an opening onto the adhesive, the opening including an aperture disposed above a region where the image sensor chip is mounted and an aperture for transmitting a light beam emitted by a light source disposed above the light-transmitting substrate; a step for attaching the upper surface of the light-transmitting substrate to the reinforcement plate by applying pressure thereon, without allowing the reinforcement plate to be tilted in any way; a step for applying transparent resin to the inside of the opening of the reinforcement plate, the transparent resin covering the image sensor chip; and a step for curing the transparent resin into a transparent protection layer for giving protection to the image sensor.

In still another embodiment of the invention, the image sensor chip includes electrodes each having a metal bump formed thereon.

In still another embodiment of the invention, the metal bumps are made of Au.

In still another embodiment of the invention, the metal bumps are made of solder.

In still another embodiment of the invention, a plated metal layer made of solder is formed on the conductor layer formed on the upper surface of the light-transmitting substrate.

Thus, the invention described herein makes possible the advantages of (1) providing an image sensor device in which, by incorporation of one or two slits, optical crosstalk and optical noises occurring due to an unnecessary portion of reflected light are reduced, improving the resolution of the image sensor device, (2) providing an image sensor unit in which such an image sensor device is used, and (3) methods for producing such an image sensor device and an image sensor unit.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

EXAMPLE 1

Figure 1:
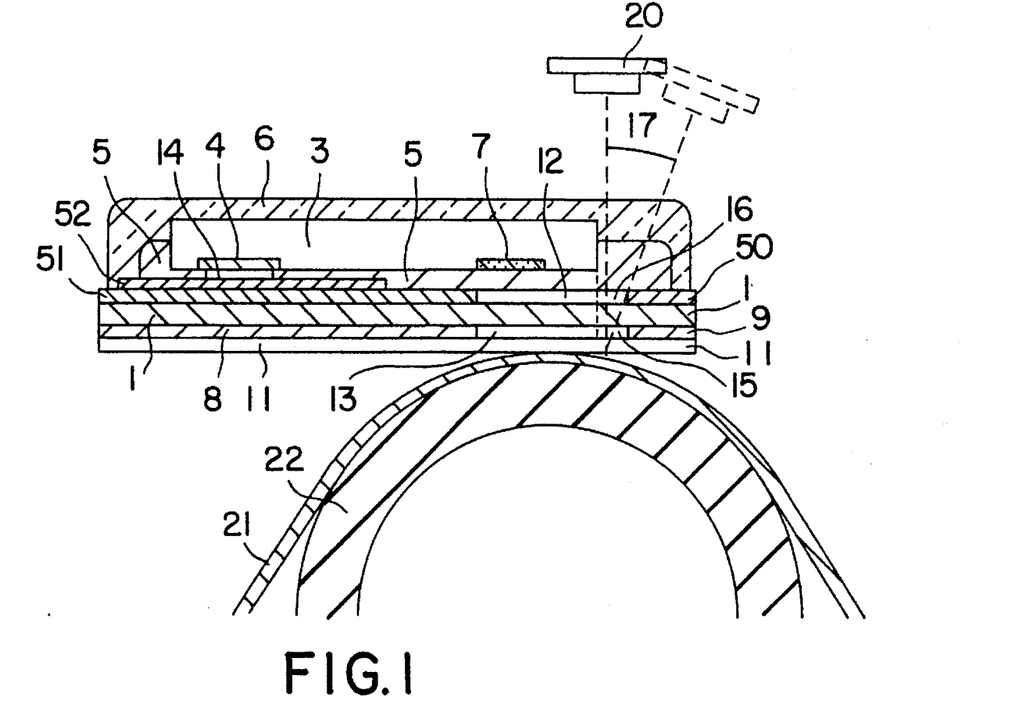
FIG. 1 is a view showing a front cross section of an image sensor unit according to a first example of the present invention.

FIG. 1 shows a direct-contact type image sensor device according to the present invention, in which a transparent film substrate 1 is used. On the upper surface of the transparent film substrate 1, a light-interrupting layer 51 and a light-interrupting portion 50 are provided. On the light-interrupting layer 51, a patterned circuit conductor layer 52 is formed. Under the transparent film substrate 1, a transparent electrically conductive film 11 is formed. An image sensor chip 3 is mounted face-down on the upper surface of the transparent film substrate 1 by a flip-chip-bonding method, with a transparent insulating resin layer 5 interposed therebetween. The transparent insulating resin layer 5 may be formed of a photo-curable resin or a photo-thermal cross-linkable insulating resin.

Electrodes 4 and a light-sensitive element array 7 are provided on the image sensor chip 3. A metal bump 14 of Au is provided on each electrode 4. However, the metal bumps 14 are not essential components of the present invention. The circuit conductor layer 52 is electrically connected to the electrodes 4 byway of the metal bumps 14.

Figure 2:
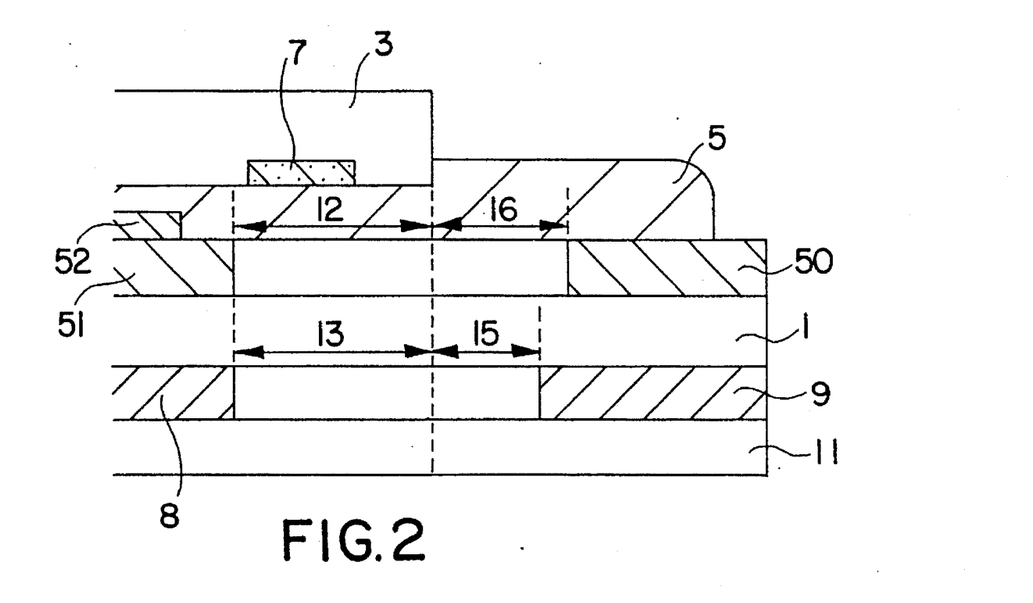
FIG. 2 is a view showing a first slit and a second slit of an image sensor device according to a first example of the present invention.

A region where the light-interrupting portion 50 is formed will be described with reference to FIG. 2. As is shown in FIG. 2, the region is, on the upper surface of the transparent film substrate 1, spaced by a distance in the range of 0.1 to 0.7 mm from an end of the image sensor chip 3 in the vicinity of which the light-sensitive element array 7 is formed. Thus, a first slit 16 for transmitting a portion of a light beam emitted by a light source 20 is formed. Underneath the light-sensitive element array 7, an opening 12 for transmitting light reflected by an original 21 is formed. In regions where the opening 12 and the first slit 16 are not formed, the light-interrupting layer 51 and the light-interrupting portion 50 are formed.

As is shown in FIG. 1, the light-interrupting portion 50 partially interrupts a light beam which is emitted from the light source 20 disposed above the transparent film substrate 1 and is radiated on the original 21 through the transparent film substrate 1. The image sensor chip 3 and the light-interrupting portion 50 work together as an optical throttle (i.e. an equivalent of a diaphragm of a camera, etc.) for the light beam. A transparent protection layer 6 is formed over the transparent film substrate 1 so as to cover the image sensor chip 3.

Between the lower surface of the transparent film substrate 1 and the transparent conductive film 11, a second conductor layer is further provided. The second conductor layer includes a conductor portion 8 and a second light-interrupting portion 9. As is shown in FIG. 2, the region where the second light-interrupting portion 9 is formed is shifted from a region directly under the image sensor chip 3. More specifically, the second light-interrupting portion 9 is, on the lower surface of the transparent film substrate 1, spaced by a distance in the range of 0.05 to 0.5 mm from an end of the image sensor chip 3 in the vicinity of which the light-sensitive element array 7 is formed. Thus, a second slit 15 for transmitting a portion of a light beam emitted by a light source 20 is formed. An opening 13 for transmitting light reflected by the original 21 is formed underneath the light-sensitive element array 7. In regions where the opening 13 and the second slit 15 are not formed, the second light-interrupting portion 9 and the conductor portion 8 are formed.

The second conductor layer may be made of a black or brown electrically conductive material formed to a thickness in the range of 5 to 30 μm. The conductor portion 8 may be used as a conductive light-interrupting layer. The second conductor layer may be an electrically conductive film formed of a phenol type or urethane acrylate type resin, etc. in which electrically conductive particles of carbon black, indium oxide, tin oxide, or the like are mixed. The sheet resistance of such an electrically conductive film should be $10^6$ Ω/□ or less.

The conductor layer 8 may be formed as a second circuit portion by patterning the second conductor layer. In cases where a second circuit portion 8 is formed, a through hole for electrically interconnecting the circuit conductor layer 52 (formed on the upper surface of the transparent film substrate 1) and the second circuit portion 8 (formed on the lower surface of the transparent film substrate 1) may be provided, thus forming wirings on both surfaces of the transparent film substrate 1.

The transparent conductive film 11, which is slightly electrically conductive, is formed in the entire area of the lower surface of the transparent film substrate 1. It is possible to improve the electrostatic resistance of the device by connecting the second light-interrupting portion 9 of the second conductive layer to the ground level.

The light source 20 is an LED (Light Emitting Diode) array radiating a light beam on the original 21 from above the image sensor device. The light beam goes through the first slit 16 and the second slit 15 so as to be incident to a lowermost face of the image sensor device (i.e. the face that comes in contact with the original 21) at an incident angle in the range of 0° to 30°, as is shown in FIG. 1. Thus, the light beam, reflected by the original 21, is led light-sensitive element array 7 of the image sensor chip 3.

The light beam radiated by the light source 20 should have an incident angle 17 in the range of 0° to 30° with respect to the vertical axis of the image sensor chip 3. More specifically, the light beam may tilt from directly above the image sensor chip 3 by an angle in the range of 0° (, when the light beam is directly above the image sensor chip 3,) to 30° in direction in which the original is conveyed (defined as the "sub-scanning direction").

The first light-interrupting portion 50 interrupts an unnecessary portion of light entering from above the first slit 16. As a result, flares and crosstalk can be minimized. The second slit 15 not only controls the light beam radiated on the original 21, but also controls light reflected by the original 21 and entering the light-sensitive element array 7. Since the second light-interrupting portion 9 interrupts the unnecessary portion of the light reflected by the original 21, optical crosstalk can be prevented. The second light-interrupting portion 9 interrupts the unnecessary portion of the light reflect ed by the original 21 more efficiently than the first light-interrupting portion 50, since the second light-interrupting portion 9 is disposed closer to the original 21 than the first light-interrupting portion 50. Furthermore, the first light-interrupting portion 50 also prevents light reflected by places other than the original 21, such as the surface of the second light-interrupting portion 9, from reaching the light-sensitive element array 7. As has been described, by providing two light-interrupting portions, namely the first light-interrupting portion 50 and the second light-interrupting portion 9, the unnecessary portion of light is interrupted more effectively than in cases where only one light-interrupting portion is provided. As a result, optical noises can be reduced, whereby the signal to noise ratio and resolution of the device are improved.

The original 21 is conveyed to a reading site of a reading portion of the image sensor device by means of an electrically conductive roller 22. The electrically conductive roller 22 is formed of electrically conductive rubber obtained by imparting electrical conductivity to an elastomer substrate of polyurethane, silicon rubber, or the like, by adding carbon black, acetylene black, zinc oxide, tin oxide, or the like thereto. The sheet resistance of such electrically conductive rubber should preferably be $10^5$ Ω/□ or less. Static electric charges occurring due to the original 21 rubbing against various portions of the device, etc. can be reduced by connecting the roller 22 and metallic portions of the device to the ground level. As a result, optical noises can be reduced.

EXAMPLE 2

Hereinafter, an image sensor device and an image sensor unit according to a second example of the present invention will be described.

Figure 3:
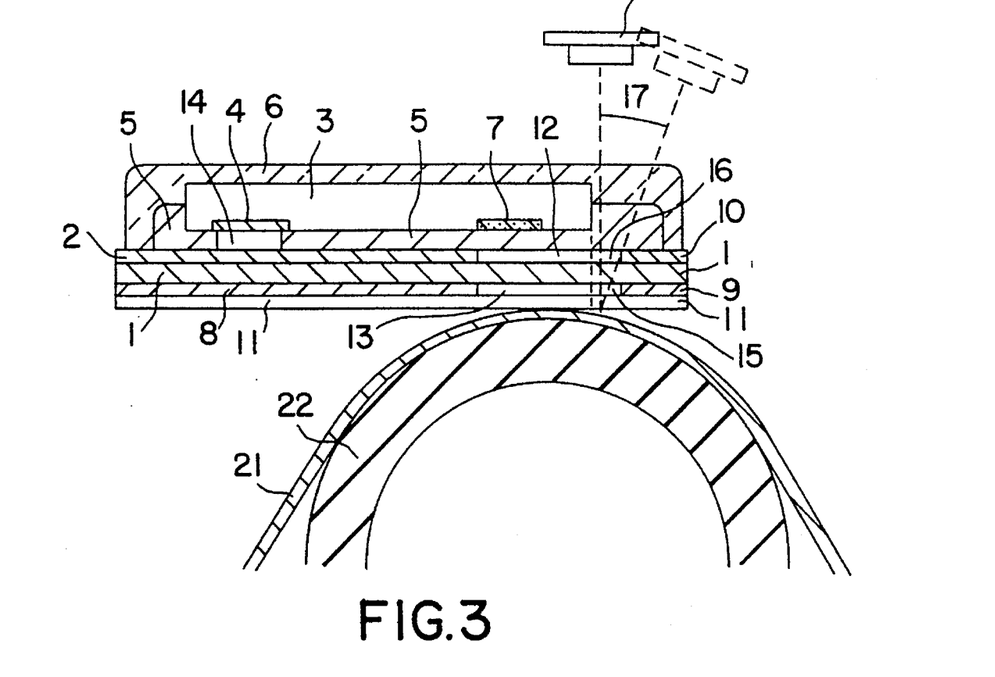
FIG. 3 is a view showing a front cross section of an image sensor unit according to a second example of the present invention.

FIG. 3 shows a direct-contact type image sensor device in which a transparent film substrate 1 is used. Components of the image sensor device which also appear in the image sensor device of the first example are assigned with the same reference numerals as those in the first example.

On the upper surface of the transparent film substrate 1, a conductor layer is formed. By patterning the conductor layer, a circuit portion 2 and a light-interrupting portion 10 are formed. Under the transparent film substrate 1, a transparent electrically conductive film 11 is formed. An image sensor chip 3 is mounted face-down on the upper surface of the transparent film substrate 1 by a flip-chip-bonding method, with a transparent insulating resin layer 5 interposed therebetween. The transparent insulating resin layer 5 may be formed of a photo-curable resin or a photo-thermal cross-linkable insulating resin. A transparent protection layer 5 is formed over the transparent film substrate 1 so as to cover the image sensor chip 3.

Electrodes 4 and a light-sensitive element array 7 are provided on the image sensor chip 3. A metal bump 14 of Au is provided on each electrode 4. However, the metal bumps 14 are not essential components of the present invention. The circuit portion 2 is electrically connected to the electrodes 4 by way of the metal bumps 14.

The light-interrupting portion 10 partially interrupts a light beam which is emitted from a light source 20 disposed above the transparent film substrate 1 and is radiated on an original 21 through the transparent film substrate 1. The image sensor chip 3 and the light-interrupting portion 10 work together as an optical throttle for the light beam.

Figure 4:
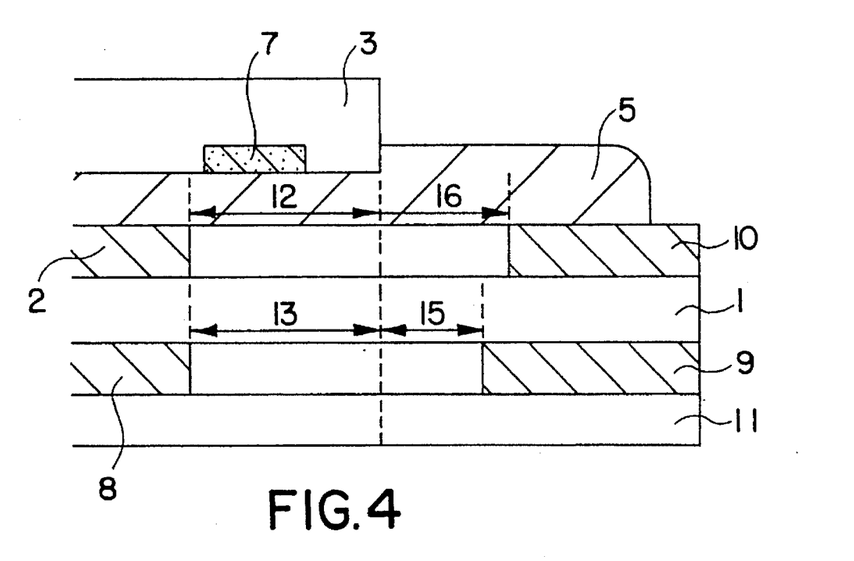
FIG. 4 is a view showing a first slit and a second slit of an image sensor device according to a second example of the present invention.

A region where the light-interrupting portion 10 is formed will be described with reference to FIG. 4. As is shown in FIG. 4, the region where the light-interrupting portion 10 is formed is shifted from a region directly under the image sensor chip 3. More specifically, the region is, on the upper surface of the transparent film substrate 1, spaced by a distance in the range of 0.1 to 0.7 mm from an end of the image sensor chip 3 in the vicinity of which the light-sensitive element array 7 is formed. Thus, a first slit 16 for transmitting a portion of a light beam emitted by The light source 20 is formed. An opening 12 for transmitting light reflected by the original 21 is formed underneath the light-sensitive element array 7. In regions where the opening 12 and the first slit 16 are not formed, the conductor layer having the light-interrupting portion 10 and the circuit portion 2 is formed.

As is shown in FIG. 3, between the lower surface of the transparent film substrate 1 and the transparent conductive film 11, a second conductor layer formed by patterning is further provided. The second conductor layer includes a second light-interrupting portion 9. As is shown in FIG. 4, the region where the second light-interrupting portion 9 is formed is shifted from a region directly under the image sensor chip 3. More specifically, the second light-interrupting portion 9 is, on the lower surface of the transparent film substrate 1, spaced by a distance in the range of 0.05 to 0.5 mm from an end of the image sensor chip 3 in the vicinity of which the light-sensitive element array 7 is formed. Thus, a second slit 15 for transmitting a portion of a light beam emitted by a light source 20 is formed. An opening 13 for transmitting light reflected by the original 21 is formed underneath the light-sensitive element array 7. In regions where the opening 13 and the second slit 15 are not formed, the second conductor layer having the second light-interrupting portion 9 is formed.

Figure 6:
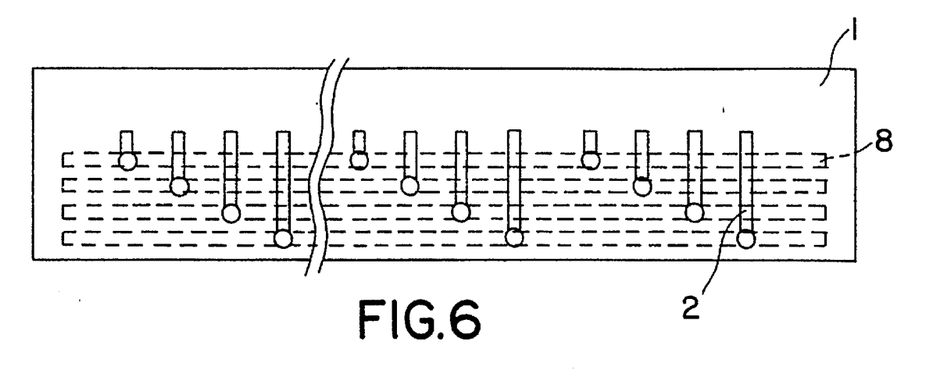
FIG. 6 is a plan view showing a circuit portion of a first conductor layer and a second conductor layer of an image sensor device according to the present invention.

As in the first example of the present invention, a second circuit portion 8 may be formed during the patterning process of the second conductor layer. In cases where a second circuit portion 8 is formed, a through hole for electrically interconnecting the circuit portion 2 (of the conductor layer formed on the upper surface of the transparent film substrate 1) and the second circuit portion 8 (of the second conductor layer formed on the lower surface of the transparent film substrate 1) may be provided thus forming wirings on both surfaces of the transparent film substrate 1. FIG. 6 shows a circuit conductor layer in cases where wirings are provided on both surfaces of the transparent film substrate 1. The light-interrupting portion 10 and the second light-interrupting portion 9 are not shown in FIG. 6.

The transparent conductive film 11, which is slightly electrically conductive, is formed on the entire area of the lower surface of the transparent film substrate 1. It is possible to improve the electrostatic resistance of the device by connecting the second light-interrupting portion 9 of the second conductive layer to the ground level.

As in the first example of the present invention, the light source 20 is composed of an LED (Light Emitting Diode)

array radiating a light beam on the original 21 from above the image sensor device. Also as in the first example, the light beam goes through the first slit 16 and the second slit 15 so as to be incident to the lowermost face of the image sensor device (i.e. the face that comes in contact with the original 21) at an incident angle in the range of 0° to 30°. Thus, the light beam, reflected by the original 21, is led to the light-sensitive element array 7 of the image sensor chip 3.

The first light-interrupting portion 10 interrupts an unnecessary portion of light entering from above the first slit 16. As a result, flares and crosstalk can be minimized. The second slit 15 not only controls a light beam radiated on the original 21, but also controls light reflected by the original 21 end entering the light-sensitive element array 7. Since the second light-interrupting portion 9 interrupts the unnecessary portion of the light reflected by the original 21, optical crosstalk can be prevented.

The second light-interrupting portion 9 interrupts the unnecessary portion of the light reflected by the original 21 more efficiently than the first light-interrupting portion 10, since the second light-interrupting portion 9 is disposed closer to the original 21 than the first light-interrupting portion 10. Furthermore, the light-interrupting portion 10 also prevents light reflected by places other than the original 21, such as the surface of the second light-interrupting portion 9, from reaching the light-sensitive element array 7. As has been described, by providing two light-interrupting portions, namely the first light-interrupting portion 10 and the second light-interrupting portion 9, the unnecessary portion of light is interrupted more effectively then in cases where only one light-interrupting portion is provided. As a result, optical noises can be reduced, whereby the signal to noise ratio and resolution of the device are improved.

Referring back to the first example of the present invention, the light-interrupting layer 51 and the light-interrupting portion 50 therein are formed by printing. Therefore, depending on the accuracy of printing, the width of the first slit 16 may have variations. If the width of the first slit 16 becomes larger than the range predetermined therefor, an additional portion of light is transmitted therethrough. As a result, optical noises may disadvantageously occur, lowering the MTF value and/or resolution of the device.

In the present example, therefore, the first light-interrupting portion 10 and the first circuit portion 2 are formed by patterning the same conductor layer (which is disposed on the upper surface of the transparent film substrate 1), using the same mask. As a result, the light-interrupting portion 10 can be positioned accurately in a predetermined location with respect to the circuit portion 2. The configuration of the light-interrupting portion 10 can also be formed accurately. As a result, the slit 16 can be formed with an accurate configuration, minimizing the above-mentioned problem occurring due to variations in the width of the slit 16. It is important to accurately form the slits 16 and 15 in order to control the amount of light to be transmitted therethrough, and thereby to control the sensitivity of the image sensor device.

Hereinafter, a method for producing an image sensor unit according to the present invention will be described.

First, the image sensor chip 3 is fabricated in the following manner: By a common semiconductor-fabricating process, the light-sensitive element array 7 composed of phototransistors, photodiodes, etc. and an access circuit (not shown) including CCDs, MOS (Metal Oxide Semiconductor)-ICs (Integrated Circuits), or bipolar ICs are formed on a single-crystal silicon substrate (silicon wafer). Upon the electrodes 4, wires made of Au are wire-bonded so as to form the metal bumps 14. The metal bumps 14 protrude from the surface of the silicon wafer by about 10 μm and a few to 60 μm. The metal bumps 14 may alternatively be formed of solder instead of Au wires. The metal bumps can be formed by an electric plating method or a ball-bonding method. Then, after confirming that devices on the silicon wafer operates satisfactorily, the silicon wafer is cut out by a fine dicing technique so as to form the image sensor chip 3. In the other examples of the present example, the image sensor chip 3 is fabricated in the same manner as that described herein.

Next, the image sensor chip 3 is mounted on a light-transmitting substrate, i.e. the transparent film substrate 1. The transparent film substrate 1 is made of polyarylate (PAR), polyethersulfone (PES), polyethylene terephthalate (PET), polyethylene naphthalate (PEN), or the like. Materials also applicable to the transparent film substrate 1 are, for example, polyetherimide (PEI), polycarbonate (PC), and polyetheretherketone (PEEK). The thickness of the transparent film substrate 1 should be in the range of 10 to 200 μm.

A metal such as Cu or Au is deposited on the transparent film substrate 1 to a thickness in the range of 0.5 to 20 μm so as to form the first conductor layer, using a sputtering method, a vapor deposition method or the like. The first conductor layer may alternatively be formed of a metal foil or the like. The second conductor layer is formed on the lower surface of the transparent film substrate 1 in a similar process.

Then, the first conductor layer is patterned by a photolithography method into the circuit portion 2 and the light-interrupting portion 10. In the patterning process, the opening 12 for leading light into the light-sensitive element array 7 and the first slit 16 are also formed. The light-interrupting portion 10 is formed in a region which is, on the upper surface of the transparent film substrate 1, spaced by a distance in the range of 0.1 to 0.7 mm from a region directly under an end of the image sensor chip 3 in the vicinity of which the light-sensitive element array 7 is formed. The distance in the range of 0.1 to 0.7 mm defines the width of the first slit 16. Then, the second conductor layer is patterned so as to form the second light-interrupting portion 9. The opening 13 and the second slit 15 having a width in the range of 0.05 to 0.5 mm are formed in a similar process.

Portions of the second conductor except the light-interrupting portion 9 can be utilized as a light-interrupting layer, but may also be patterned to form a second circuit portion 8. In cases where a second circuit portion 8 is formed, a through hole for electrically interconnecting the first circuit portion 2 and the second circuit portion 8 may be provided, thus forming wirings on both surfaces of the transparent film substrate 1.

Thereafter, a plated metal layer is formed on the circuit portion 2 (and the second circuit portion 8). The plated metal layer should preferably be formed on at least regions of the circuit portion 2 which abut the electrodes 4 or the metal bumps 14 of the image sensor chip 3. The plated metal layer may be formed of solder. However, the plated metal layer is not an essential component of the present invention.

Then, the transparent insulating resin layer 5 is formed by applying a predetermined amount of photo-curable or photo-thermal cross-likable insulating resin to e predetermined portion of the transparent film substrate 1 by a stamping method, a screen printing method, etc. Insulating resin of an acrylate type, urethane acrylate type, and epoxy acrylate type is preferable in view of adhesiveness and photosensitivity.

The image sensor chip 3 is disposed face-down on the insulating resin layer 5 so that electrodes 4 (or the metal bumps 14) abut a predetermined portion of the circuit portion 2. Then, while the image sensor chip 3 is pressed against the transparent film substrate 1, the transparent insulating resin layer 5 is irradiated with ultra violet rays through the transparent film substrate 1. In cases where the insulating resin layer 5 is made of photo-curable insulating resin, curing of the insulating resin layer 5 is completed during the irradiation with ultra violet rays.

In cases where the insulating resin layer 5 is made of photo-thermal cross-linkable insulating resin, a heat treatment is conducted in an electric furnace at a temperature higher than the thermal-curing temperature (which generally is 100° C. or more) of the insulating resin layer 5 for a certain amount of time (in the range of 5 to 20 minutes). Thus, portions of the insulating resin layer 5 which were in the shade of the circuit portion 2 and therefore uncured are completely cured.

It is preferable to place the transparent film substrate 1 with the image sensor chip 3 thereon in an electric furnace at a temperature higher than the melting point (170° C. to 190° C.) of the plated metal layer so as to conduct a heat treatment for a certain amount of time (in the range of 5 to 20 minutes). Thus, the electrodes 4 and the circuit portion 2 are firmly interconnected. This heat treatment process can be conducted simultaneously with the above-mentioned heat treatment conducted for thermally curing the insulating resin layer 5.

In order to securely mount the image sensor chip 3, it is preferable to use photo-thermal cross-linkable insulating resin for the insulating resin layer 5 and to thermally cure the insulating resin and to further conduct an adequate heat treatment so as to melt the plated metal layer, as is described above.

Thus, mounting of the image sensor chip 3 is completed.

After the mounting of the image sensor chip 3 is completed, the transparent protection layer 6 is formed by applying resin of a transparent silicon or transparent acrylate type on the transparent film substrate 1 by means of a dispenser or the like, so as to cover the image sensor chip 3 and curing the resin. The transparent protection layer 6 should have a height of 5 mm or less, a refractive index of 1.8 or less, and a pencil hardness in the range of 2H to 8H.

Under the transparent film substrate 1, the transparent electrically conductive film 11 having electrostatic resistance and friction resistance is formed so as to cover the whole area of the lower surface of the transparent film substrate 1. The transparent electrically conductive film 11 is formed of a urethane acrylate type resin or the like in which electrically conductive particles of palladium, indium oxide, tin oxide, or the like are mixed. The transparent electrically conductive film 11 should have a sheet resistance of $10^9$ $\Omega/\square$ or less, a pencil hardness in the range of 3H to 9H, and a thickness in the range of 10 to 10 µm.

EXAMPLE 3

Figure 5A:
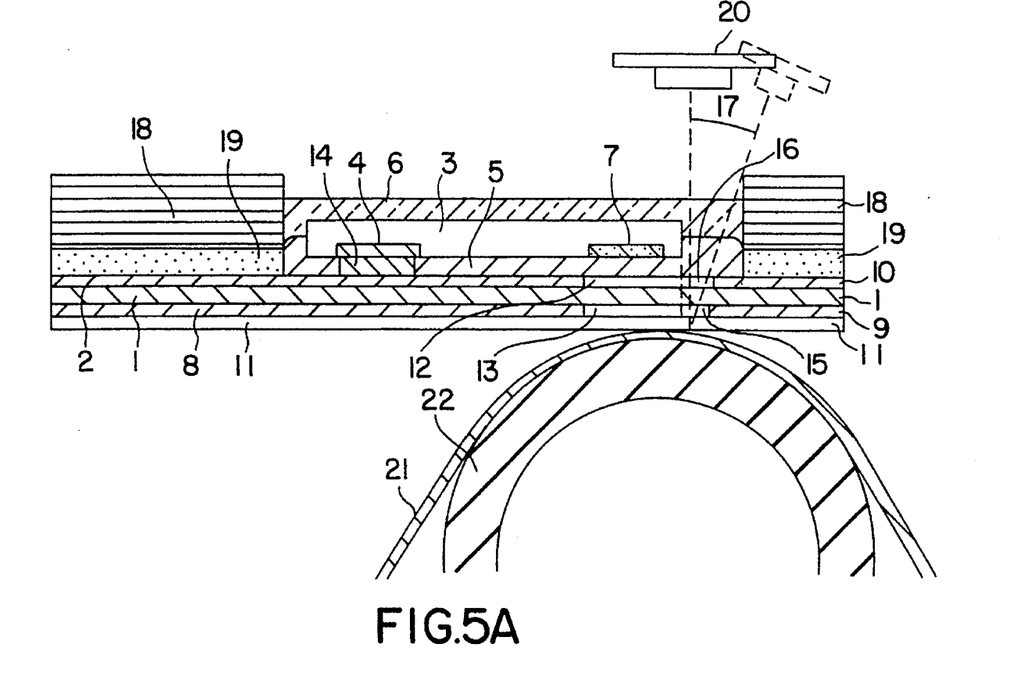
FIG. 5A is a view showing a front cross section of an image sensor unit according to a third example of the present invention.

FIG. 5A shows a direct-contact type image sensor device in which a transparent film substrate 1 is used. The image sensor device shown in FIG. 5A is obtained by further incorporating a reinforcement plate 18 in an image sensor device similar to that described in the second example of the present invention. Components of the image sensor device which also appear in the image sensor device of the second example are assigned with the same reference numerals as those in the second example.

Figure 5B:
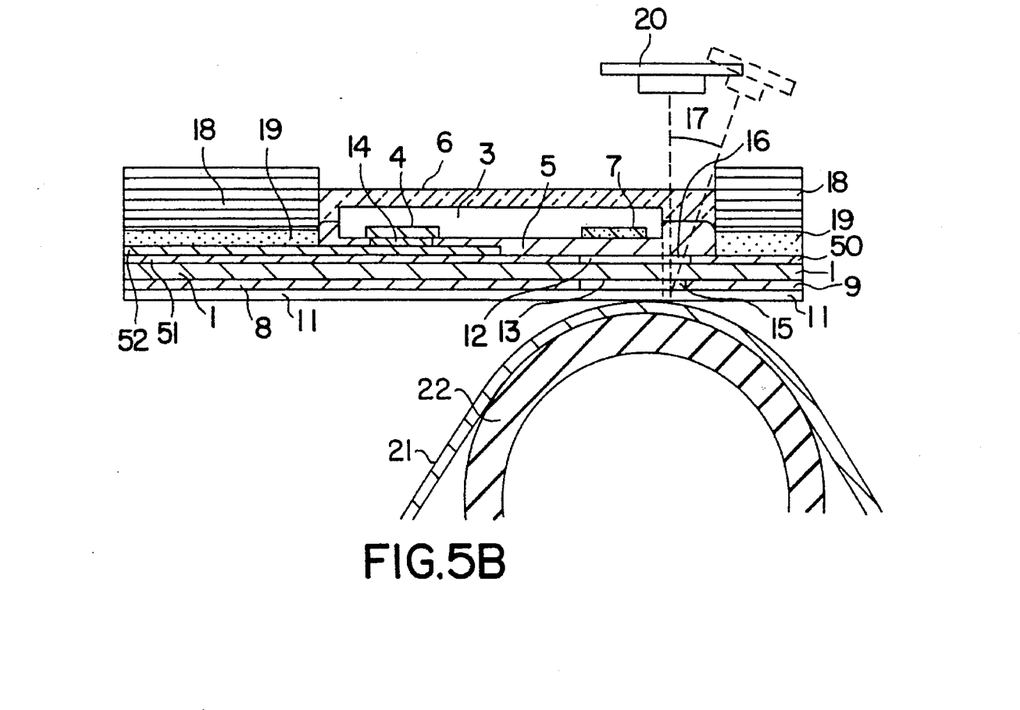
FIG. 5B is a view showing a front cross section of an image sensor unit according to a third example of the present invention.

It is possible to incorporate a reinforcement plate 18 in the image sensor device of the first example. FIG. 5B Shows an image sensor device obtained by further incorporating the reinforcement plate 18 in the image sensor device of the first example. However, the present example will be described with reference to FIG. 5A.

The transparent film substrate 1, a conductor layer formed on the upper surface of the transparent film substrate 1, an image sensor chip 3, electrodes 4 and a light-sensitive element array 7 provided on the image sensor chip 3, Au bumps 14, an insulating resin layer 5, a second conductor layer formed under the transparent film substrate 1, and the transparent electrically conductive film 11 are formed similarly to those in the image sensor device of the second example. The image sensor chip 3 is mounted face-down on the upper surface of the transparent film substrate 1 by a flip-chip-bonding method, with the insulating resin layer 5 interposed therebetween. The insulating resin layer 5 is made of insulating resin of a photo-curable or photo-thermal cross-linkable insulating resin.

A light-interrupting portion 10, a second light-interrupting portion 9, a first circuit portion 2, and a second circuit portion 8 are also formed similarly to those in the image sensor device of The second example. A first slit 16, an opening 12, a second slit 15, and another opening 13 are also formed similarly to those in the image sensor device of the second example. A light source 20 is disposed in such a way that a light beam radiated thereby goes through the first slit 16 and the second slit 15 so as to be incident to the lowermost face of the image sensor device (i.e. the face that comes in contact with an original 21) at an incident angle in the range of 0° to 30°.

Figure 7:
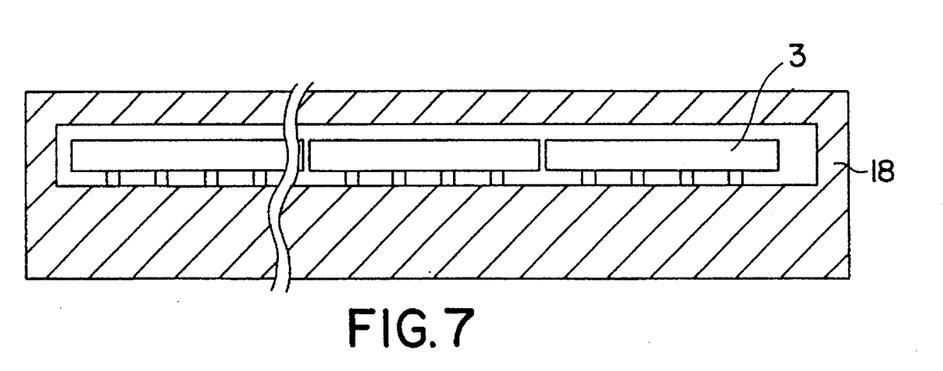
FIG. 7 is a plan view showing a reinforcement plate in an image sensor device according to the present invention.

In the present example, the reinforcement plate 18 having an opening is provided on the upper surface of the transparent film substrate 1. As is seen from FIG. 7, the image sensor chip 3 is disposed in the opening of the reinforcement plate 18. A light beam emitted by the light source 20 is radiated on the original 21 through the opening of the reinforcement plate 18.

The reinforcement plate 18 is attached to the upper surface of the transparent film substrate 1 by an adhesive 19. Inside the opening of the reinforcement plate 18, a transparent protection layer 6 for protecting the image sensor chip 3 is formed. The reinforcement plate 18 is a printed wiring board having a thickness of 50 µm or more, and also serves as a driving circuit. On the upper surface of the printed wiring board, driving circuit elements are mounted, while electrodes of the driving circuit are formed on the lower surface of the printed wiring board. The electrodes of the driving circuit are electrically connected to the second circuit portion 8 on the transparent film substrate 1. For example, a plated metal layer may be provided on each electrode of the driving circuit and the first circuit portion 2; thus, the electrodes of the driving circuit can be rapidly soldered to the first circuit portion 2 by means of a pulse-heat type soldering apparatus or the like.

The reinforcement plate 18 may also be formed of glass, plastic, or the like having a color capable of interrupting light, such as black or brown.

By providing the reinforcement plate 18, a portion of the image sensor device for transmitting light can be formed thinner. Thus, the distance between the light-sensitive element array 7 and the original 21 can be reduced to 150 μm or less, the distance being defined as the sum total of the thicknesses of the insulating resin layer 5, the transparent film substrate 1, the first and second conductive layers, and the transparent conductive film 11.

Hereinafter, a method for producing the image sensor device of the present invention will be described. The process for forming conductor layers on the upper and lower surfaces of the transparent film substrate 1 and patterning the conductor layers into the light-interrupting portion 10, the circuit portion 2, and the second light-interrupting portion 9 (and optionally the circuit portion 8) is the same as the process for forming those in the image sensor device of the second example.

First, the adhesive 19 is applied on a predetermined portion of the upper surface of the transparent film substrate 1. The predetermined portion is defined as a portion except: a region where the image sensor chip 3 is mounted, a light transmitting portion for a light beam from the light source 20 to the original 21 (i.e. the optical path of the device), and connecting portions where the circuit portion 2 is to be soldered to the electrodes of the printed wiring board of the reinforcement plate 18. After the application of the adhesive 19, the reinforcement plate 18 is placed on the upper surface of the transparent film substrate 1. By applying pressure, the reinforcement plate 18 adheres to the upper surface of the transparent film substrate 1 so as not to be tilted in any way.

Next, the image sensor chip 3 is mounted face-down on the transparent film substrate 1, with the insulating resin layer 5 interposed therebetween. The insulating resin layer 5 is cured in the same manner as in the second example of the present invention.

Furthermore, in order to give protection to the image sensor chip 3, transparent resin of a transparent silicon type, a transparent acrylate type, or the like is uniformly applied to the inside of the opening of the reinforcement plate 18 by means of a dispenser or the like so as to form the transparent protection layer 6. The transparent protection layer 6 should have a height of 2 mm or less, a refractive index of 1.8 or less, and a pencil hardness in the range of 2H to 8H. Herein, it must be ensured that, the reinforcement plate 18 adheres sufficiently to the transparent film substrate 1 so that the transparent resin (transparent protection layer 6) wall not leak beyond the inside of the opening of the reinforcement plate 18.

The reinforcement plate 18 may also be incorporated in a different step in the production steps of the device, for example, in a step after the image sensor chip 3 is mounted.

The direct-contact type image sensor device thus produced, or an image sensor unit in which the image sensor device is incorporated, is used in such a way that the transparent electrically conductive film 11 formed on the back side (i.e. the lower surface) of transparent film substrate 1 is in complete contact with the original 21. The light source 20 composed of an LED array radiates a light beam on the original 21 through the transparent protection layer 6, the insulating resin layer 5, the transparent film substrate 1, and the transparent electrically conductive film 11. The light beam is reflected by the original 21 and is led into the light-sensitive element array 7 thorough the transparent conductive film 11, the transparent film substrate 1 and the insulating resin layer 5. Thus, reading of information carried on Tale original 21 is conducted.

The light beam emitted by the light source 20 should have an incident angle 17 in the range of 0° to 30° with respect to the vertical axis of the image sensor chip 3. More specifically, the light beam may tilt from directly above the image sensor chip 3 by an angle in the range of 0° (when the light beam is directly above the image sensor chip 3,) to 30° in the direction in which the original is conveyed (defined as the "sub-scanning direction"). An unnecessary portion of a light beam emitted by the light source is interrupted mainly by the light-interrupting portion 10, the first slit 16 controlling the amount of light to be radiated on the original 21. The unnecessary potion of light reflected by the original 21 is interrupted mainly by the second light-interrupting portion 9, the second slit 15 controlling the amount of light entering the light-sensitive element array 7. As a result, optical crosstalk and optical noises occurring due to the unnecessary portion of reflected light is reduced, improving the resolution of the image sensor device; an MTF value of 50% (4 lp/mm) was confirmed. Moreover, by grounding the second light-interrupting portion 9 and the transparent conductive layer 11 formed on the back side of the transparent film substrate 1, the electrostatic resistance and the friction resistance of the image sensor device can be improved. Furthermore, the total thickness of the image sensor device can be reduced by incorporating the reinforcement plate 18, further improving the reading performance of the image sensor device.

According to the present invention, the circuit portion 2 and the light-interrupting portion 10 are formed by patterning the same conductor layer. As a result, the first slit 16 can be accurately positioned and accurately shaped as predetermined. The same applies to the second slit 15. Thus, variations in the widths of the slits 16 and 15 are minimized, making it possible to accurately control the amount of light incident on an original 21. Accordingly, the sensitivity of the image sensor device can be made stable. By using the slits 16 and 15 accurately formed as predetermined, the original 21 can be accurately irradiated with a light beam in the width direction of the original 21 (defined as the "main-scanning direction"), and light reflected by a portion of the original 21 that is not to be read can be interrupted effectively. As a result, only the necessary portion of the reflected light is led into the light-sensitive element array 7.

Moreover, the transmitting efficiency of light of the direct-contact type image sensor device according to the present invention is four to five times as high as that of a conventional direct-contact type image sensor device in which a lens-oriented system is used. Therefore, the light source can be composed of an LED array with lower output power.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a direct-contact type image sensor device comprising: a light-transmitting substrate having an upper surface and a lower surface; a first conductor layer formed on the upper surface of the light-transmitting substrate; a second conductor layer formed on the lower surface of the light-transmitting substrate; a transparent electrically conductive layer formed on the second conductor layer; and an image sensor chip mounted face-down on the upper surface of the light-transmitting substrate, with an insulating resin layer being interposed between the image sensor chip and the upper surface of the light-transmitting substrate, the image sensor chip being mounted by a flip-chip-bonding method, the first conductor layer including a circuit portion electrically connected to the image sensor chip and a light-interrupting portion for interrupting a portion of a light beam, the light beam being radiated on an original through the light-transmitting substrate by a light source disposed above the light-transmitting substrate, and the second conductor layer including a second circuit portion and a second light-interrupting portion for interrupting a further portion of the light beam, the method including:

a step for depositing the first conductor layer on the upper surface of the light-transmitting substrate;

a step for patterning the first conductor layer by a photolithography method so as to form the first circuit portion and the first light-interrupting portion by use of the same mask;

a step for depositing the second conductor layer on the lower surface of the light-transmitting substrate; and a step for patterning the second conductor layer by photolithography method so as to form the second circuit portion and the second light-interrupting portion by use of the same mask.

2. A method according to claim 1 further including a step for forming a through hole for electrically interconnecting the first circuit portion and the second circuit portion.

3. A method according to claim 1 further including:

a step for applying an adhesive on a portion of the light-transmitting substrate;

a step for placing a reinforcement plate having an opening onto the adhesive, the opening including an aperture disposed above a region where the image sensor chip is mounted and an aperture for transmitting a light beam emitted by a light source disposed above the light-transmitting substrate;

a step for attaching the upper surface of the light-transmitting substrate to the reinforcement plate by applying pressure thereon, without allowing the reinforcement plate to be tilted in any way;

a step for applying transparent resin to the inside of the opening of the reinforcement plate, the transparent resin covering the image sensor chip; and a step for curing the transparent resin into a transparent protection layer for giving protection to the image sensor.

4. A method for producing a direct-contact type image sensor device comprising:

a step for forming a conductor layer on an upper surface of a light-transmitting substrate, the step including a step for depositing the conductor layer on the upper surface of the light-transmitting substrate, and a step for patterning the deposited conductor layer by a photolithography method to form a circuit portion and a light-interrupting portion by use of a same mask, the light-interrupting portion interrupting a portion of a light beam which is radiated on an original through the light-transmitting substrate by a light source disposed above the light-transmitting substrate;

a step for forming a transparent electrically conductive layer on a lower surface of the light-transmitting substrate; and a step for mounting an image sensor chip face-down on the upper surface of the light-transmitting substrate, with an insulating resin layer being interposed between the image sensor chip and the conductor layer, so that the image sensor chip is electrically connected to the circuit portion of the conductor layer, the image sensor chip being mounted by a flip-chip-bonding method.

5. A method for producing a direct-contact type image sensor device comprising:

a step for forming a first conductor layer on an upper surface of a light-transmitting substrate, the step including a step for depositing the first conductor layer on the upper surface of the light-transmitting substrate, and a step for patterning the deposited first conductor layer by a photolithography method to form a first circuit portion and a first light-interrupting portion by use of a same mask, the first light-interrupting portion interrupting a portion of a light beam which is radiated on an original through the light-transmitting substrate by a light source disposed above the light-transmitting substrate;

a step for forming a second conductor layer on a lower surface of the light-transmitting substrate, the step including a step for depositing the second conductor layer on the lower surface of the light-transmitting substrate, and a step for patterning the second conductor layer by a photolithography method to form a second circuit portion and a second light-interrupting portion by use of the same mask, the second light-interrupting portion interrupting a further portion of the light beam;

a step for forming a transparent electrically conductive layer on the second conductor layer; and a step for mounting an image sensor chip face-down on the upper surface of the light-transmitting substrate, with an insulating resin layer being interposed between the image sensor chip and the conductor layer, so that the image sensor chip is electrically connected to the first circuit portion of the first conductor layer, the image sensor chip being mounted by a flip-chip-bonding method.

6. A method for producing a direct-contact type image sensor device comprising: a light-transmitting substrate having an upper surface and a lower surface; a conductor layer formed on the upper surface of the light-transmitting substrate; a transparent electrically conductive layer formed on the lower surface of the light-transmitting substrate; and an image sensor chip mounted face-down on the upper surface of the light-transmitting substrate, with an insulating resin layer being interposed between the image sensor chip and the upper surface of the light-transmitting substrate, the image sensor chip being mounted by a flip-chip-bonding method, and the conductor layer including a circuit portion electrically connected to the image sensor chip and a light-interrupting portion for interrupting a portion of a light beam, the light beam being radiated on an original through the light-transmitting substrate by a light source disposed above the light-transmitting substrate, the method including:

a step for depositing the conductor layer on the upper surface of the light-transmitting substrate; and a step for patterning the conductor layer by a photolithography method so as to form the circuit portion and the light-interrupting portion by use of the same mask.

7. A method according to claim 6, wherein the light-interrupting portion is formed in a region which is shifted from a region directly under the image sensor chip, thereby the light-interrupting portion and the image sensor chip serve as a diaphragm for the light beam directed from the light source to the original.

* * * * *

UNITED STATES PATENT AND TRADE MARK OFFICE
CERTIFICATE OF CORRECTION

PATENT NO.   : 5,556,809
DATED        : September 17, 1996
INVENTOR(S)  : Nakagawa et al.

It is certified that error appears in the above-identified patent and that said Letters Patent is hereby corrected as shown below:

On the Cover Page, item [57] Abstract, line 5, delete "e" and insert therefor --a--.

Signed and Sealed this

Fourth Day of March, 1997

Attest:

BRUCE LEHMAN

*Attesting Officer*    Commissioner of Patents and Trademarks